No. 661,400. Patented Nov. 6, 1900.
A. R. FEISTEL.
MACHINE FOR MAKING SHOVEL HANDLES.
(Application filed Apr. 3, 1900.)
(No Model.) 2 Sheets—Sheet 1.

WITNESSES:
Jos. A. Ryan
Amos H Hart

INVENTOR
Agustus R. Feistel.
BY Munn
ATTORNEYS

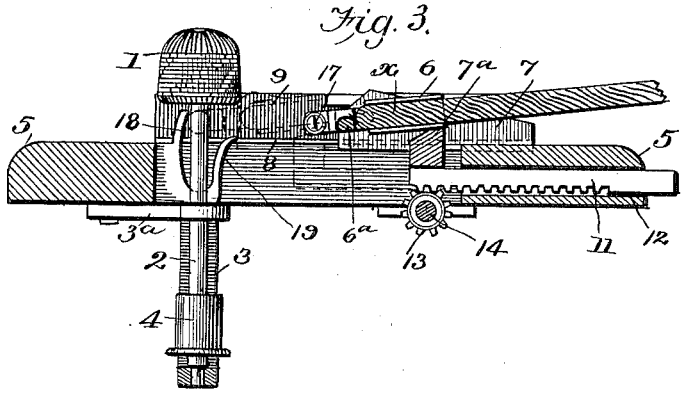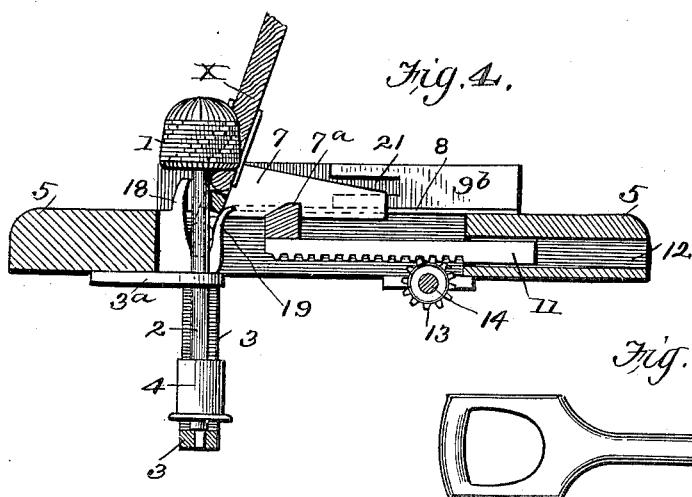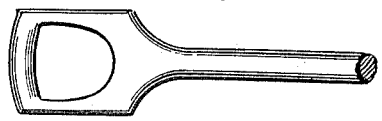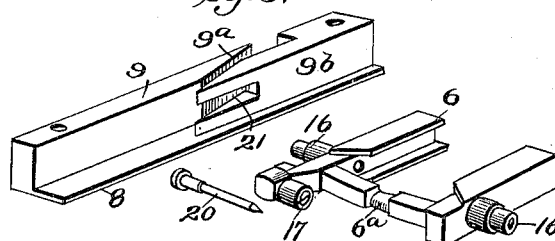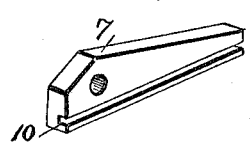

UNITED STATES PATENT OFFICE.

AUGUSTUS R. FEISTEL, OF PHILIPSBURG, PENNSYLVANIA.

MACHINE FOR MAKING SHOVEL-HANDLES.

SPECIFICATION forming part of Letters Patent No. 661,400, dated November 6, 1900.

Application filed April 3, 1900. Serial No. 11,324. (No model.)

*To all whom it may concern:*

Be it known that I, AUGUSTUS R. FEISTEL, residing at Philipsburg, in the county of Center and State of Pennsylvania, have made certain new and useful Improvements in Machines for Making Shovel-Handles, of which the following is a specification.

My invention is a machine for cutting the D-holes in the blanks of shovel and fork handles. A handle-blank is clamped in a vertically-tiltable holder pivoted in a horizontally-slidable carrier or carriage by which it is fed to a rotatable cutter-head. The holder is tilted into vertical position while the cutter is forming the D-hole in the handle-blank and is thrown back to horizontal position as the carriage recedes. The blank is then reversed in the holder and the operation is repeated.

Figure 1:
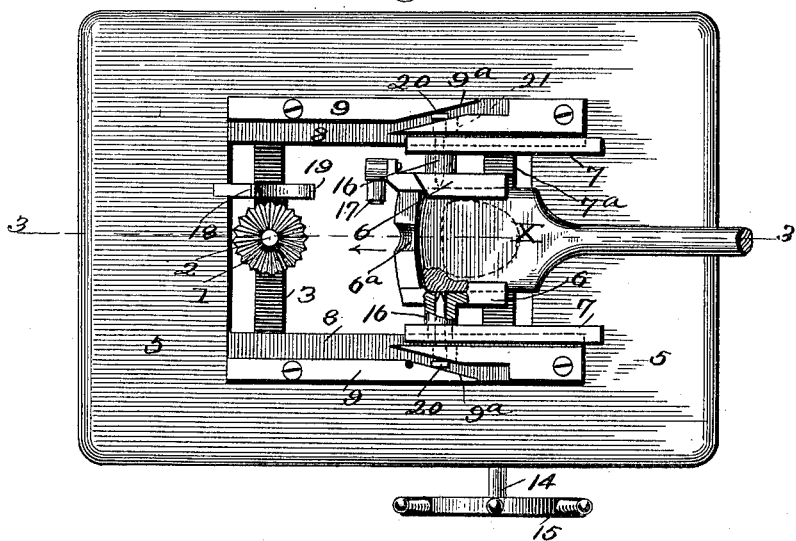
Figure 2:
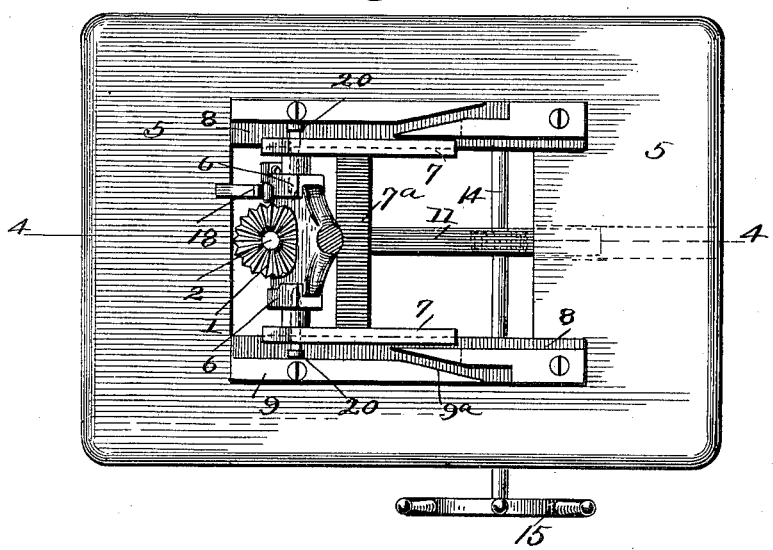

In the accompanying drawings, two sheets, Figure 1 is a plan view of my improved machine. Fig. 2 is a plan view showing the slidable carriage advanced to the cutter and the shovel-handle blank tilted upward. Fig. 3 is a central longitudinal section on the line 3 3 of Fig. 1. Fig. 4 is a longitudinal section on the line 4 4 of Fig. 2. Fig. 5 includes perspective views of important parts of the machine detached from each other. Fig. 6 is a plan view of a shovel-handle in the form in which it leaves the machine.

A cutter or cutter-head 1 is fixed on the upper end of a vertical shaft 2, (see Figs. 3 and 4,) which is held in suitable bearings 3 3ª and provided with a pulley 4 for application of a driving-band. This shaft is arranged in a rectangular slot or opening formed in the horizontal bed 5 of the machine. The shovel-handle blank X is held in a holder 6, which is pivoted in a carriage 7, adapted to slide horizontally on the flanges 8 of side guides 9, arranged parallel on each side of the aforesaid opening in the bed 5. The said carriage 7 is composed of two bars (see Fig. 5) having internal grooves 10, adapted to receive the flanges 8 of the side guides 9. These grooved bars 7 are connected by cross-bar 7ª, to which a rack-bar 11 is attached. The said rack-bar slides in a passage or guide-slot 12, formed in the bed or frame 5, and is engaged by a pinion 13, (see Figs. 3 and 4,) which is keyed upon a shaft 14, arranged beneath the bed or frame 5 in suitable bearings and adapted to be rotated by a hand-wheel 15. In some cases I may dispense with the hand-wheel and substitute a pulley or other device adapted to be acted upon by an automatic reversible motor. By means of such rack-bar and pinion the carriage 7 is advanced toward and withdrawn from the cutter 1 as required in the operation of cutting the D-hole in the handle-blank X.

The holder 6, in which the blank is secured, consists (see Fig. 5) of two parallel internally grooved or flanged bars which are rigidly connected by a cross-bar 6ª. The bars 6 of the holder are provided exteriorly with hollow trunnions 16, by which it is pivoted and adapted to rotate in the side bars of the carriage 7. One of the bars 6 of the blank-holder is extended forward and provided with a lateral projection 17, consisting of a pin having an antifriction-sleeve. Such projection 17 comes in contact with a fixed and forwardly-curved cam 18, (see Figs. 3 and 4,) when the carriage advances, whereby the holder 6 is automatically tilted from the horizontal to the vertical position. Figs. 2 and 4 show the holder 6 with its contained blank X thrown upward to a slight angle from the vertical. As the carriage 7 recedes from the cutter 1 the aforesaid projection 17 strikes upon another cam 19, arranged opposite and adjacent to the first-named cam 18, and said cam 19 being curved rearwardly it serves to throw the holder 6 automatically back to its original or horizontal position. The handle-blank X is then reversed or turned over and the operation is repeated. In other words, it requires two forward and backward movements of the carriage 7 and reversal of the blank X to completely form the D-hole in the latter.

For clamping and securing the blank X in the holder 6 during the operation described I provide pins 20, which pass through the hollow trunnions 16 of said holder and are provided with enlarged heads (see Fig. 5) to adapt them for engagement with cams 9ª and retractors 9ᵇ, which form portions or attachments of the side guide-bars 9—that is to say, when the carriage 7 is in the position shown in Figs. 1 and 3 the heads of the pins 20 are in contact with the inclines or cams 9ª and in the slot 21 of the retractors 9ᵇ. In such case, therefore, the pins are retracted as a whole and do not project through the side bars 6 of the blank-holder. On the other hand, as the carriage advances, the heads of the pins 20 sliding in contact with the inclines or cams $9^a$, the pins are necessarily forced inward and enter the sides of the blanks X, and thus clamp and secure the same in the holder 6. This engagement continues until the carriage recedes, when the heads of the pins 20 again engage the slotted retractors $9^b$, whereby they are withdrawn out of contact with the blank X, so that the latter may be removed from the holder. The punctures or indentations made in the blank X by the pins 20 are at the points where the long binding-rivet is commonly inserted in the completed shovel-handle. It is thus apparent that by the rocking or reciprocating rotary motion of the shaft 14 the carriage 7 is reciprocated and the blank-holder 6 tilted automatically, so that the operation of cutting the D-hole in the blank is effected rapidly and without any manipulation other than that required to reverse its movement, as before described.

Since the cutter begins operating on the blank as soon as the latter rises from the horizontal to the vertical, it rounds the grip or cylindrical portion of the handle proper.

The cutter 1 is essentially conical in form and composed of a conical cutter at the top, a less conical cutter at the base, and intermediate disk cutters, whose teeth are arranged spirally. I do not, however, restrict myself to any particular construction of the cutter, but propose to employ any suitable form of construction of the same.

I show the two cams or inclines by which the pins 20 are pushed in and retracted as arranged directly opposite and separated by a space sufficient to admit easy passage of the heads of the pins; but I may arrange the cams more widely separated and one in advance of the other.

I intend to include in my invention any form of devices that may be suitable for operating the pins.

What I claim is—

1. The combination with a rotatable cutter of a slidable carrier or carriage and means for reciprocating it, a tiltable holder for a shovel-handle blank which is pivoted in said carriage, and automatically-operating means for tilting the said holder as it approaches the cutter-head substantially as shown and described.

2. The combination with a rotatable cutter arranged vertically and fixed guides arranged horizontally in suitable proximity thereto, of a carrier or carriage adapted to slide on said guide toward and from the cutter, automatically-operating means for effecting such reciprocating movement, a holder for shovel-handle blanks which is pivoted in said carriage, and automatically-operating means for tilting the blank-holder to bring the blank into engagement with the cutter, substantially as shown and described.

3. The combination with a rotatable cutter of side guides arranged adjacently in horizontal position, a carriage adapted to slide thereon, means for imparting the required movement thereto, and a handle-blank holder which is pivoted in said carriage and provided with internal parallel grooves for receiving the blank, and having a projection adapted to engage a device adapted to tilt the holder gradually into vertical position, the said device being located in suitable proximity to the cutter, substantially as shown and described.

4. The combination with a rotatable cutter and suitable side guides of a reciprocating carriage, a blank-holder which is pivoted and tiltable therein, and a fixed projection or cam adapted to engage and tilt said holder substantially as shown and described.

5. The combination with the rotatable cutter and fixed guides arranged horizontally, of a slidable carriage, a blank-holder pivoted and tiltable therein, a fixed cam adapted to engage the carriage for throwing it upward into vertical position, and another cam adapted to engage the holder for throwing it back to the original position, substantially as shown and described.

6. The combination with a rotatable cutter of a blank-holder which is movable horizontally toward and from said cutter, and means for automatically tilting the same into vertical position and back to horizontal position, substantially as shown and described.

7. The combination with a cutting device of a reciprocating carriage, a blank-holder pivoted therein, pins adapted to work laterally through the trunnions of said holder, for engaging the blank, and cams fixed on the frame and arranged laterally opposite each other and separated by a space adapted for travel of the heads of said pins, whereby the latter are alternately forced inward and retracted as the carriage reciprocates, substantially as shown and described.

8. The combination with a rotatable cutter, horizontal guides fixed opposite each other on each side of the cutter, two cams arranged on each guide and consisting of two inclines, one of which is slotted and separated from the other by a narrow space, two pins provided with heads which are of greater diameter than the slots in the retracting-cam, a handle-blank holder, and a carriage in which the same is pivoted, substantially as shown and described.

9. The combination with a rotatable cutter of guides arranged horizontally on both sides of the same, two fixed cams also arranged laterally, one of the same being slotted, a carriage adapted to slide on said guides, a blank-holder pivoted in the carriage and having hollow trunnions, and headed pins adapted to coact with the said cams as described, and working through the side bars of the carriage and the trunnions and bars of the blank-holder, substantially as shown and described.

10. The combination with means for forming a hole in a blank of a slidable and tiltable holder for said blank, the same being adapted to approach and recede from the hole-forming device, means for effecting this movement, and means for tilting the holder, substantially as shown and described.

AUGUSTUS R. FEISTEL.

Witnesses:
FRED W. LOWLAND,
FRANK F. IRWIN.